(12) United States Patent
Kikuchi et al.

(10) Patent No.: US 12,352,926 B2
(45) Date of Patent: Jul. 8, 2025

(54) CONCAVE-CONVEX STRUCTURE, OPTICAL MEMBER, AND ELECTRONIC APPARATUS

(71) Applicant: DEXERIALS CORPORATION, Tokyo (JP)

(72) Inventors: Masanao Kikuchi, Tokyo (JP); Hiroshi Tazawa, Tokyo (JP); Kazuya Hayashibe, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 88 days.

(21) Appl. No.: 16/955,496

(22) PCT Filed: Dec. 18, 2018

(86) PCT No.: PCT/JP2018/046600
§ 371 (c)(1),
(2) Date: Jun. 18, 2020

(87) PCT Pub. No.: WO2019/131336
PCT Pub. Date: Jul. 4, 2019

(65) Prior Publication Data
US 2020/0319377 A1  Oct. 8, 2020

(30) Foreign Application Priority Data
Dec. 26, 2017  (JP) ................. 2017-249061

(51) Int. Cl.
*G02B 1/118* (2015.01)
*G02B 1/04* (2006.01)

(52) U.S. Cl.
CPC ............... *G02B 1/118* (2013.01); *G02B 1/04* (2013.01)

(58) Field of Classification Search
CPC ......... G02B 1/118; G02B 5/1809; G02B 1/04
(Continued)

(56) References Cited

U.S. PATENT DOCUMENTS

| | | | |
|---|---|---|---|
| 2009/0061150 A1* | 3/2009 | Noguchi | G02B 1/118 428/119 |
| 2011/0002041 A1* | 1/2011 | Tazawa | G02B 1/118 359/609 |

(Continued)

FOREIGN PATENT DOCUMENTS

| | | |
|---|---|---|
| CN | 101424751 A | 5/2009 |
| CN | 103524683 B | 4/2016 |

(Continued)

OTHER PUBLICATIONS

Nov. 16, 2021, Japanese Office Action issued for related JP Application No. No. 2017-249061.

(Continued)

*Primary Examiner* — Stephone B Allen
*Assistant Examiner* — Leonidas Boutsikaris
(74) *Attorney, Agent, or Firm* — Paratus Law Group, PLLC

(57) ABSTRACT

Provided are a concave-convex structure including more complicated concave-convex structure, an optical member, and an electronic apparatus. The concave-convex structure includes a plurality of group portions each including a plurality of concavities or convexities provided in a surface of a base material, in which average widths of areas occupied by the concavities or convexities at the surface of the base material are smaller than or equal to a wavelength belonging to a visible light band.

15 Claims, 18 Drawing Sheets

(58) Field of Classification Search
USPC .......................................................... 359/581
See application file for complete search history.

(56) References Cited

U.S. PATENT DOCUMENTS

| | | | | |
|---|---|---|---|---|
| 2011/0102900 | A1* | 5/2011 | Hayashibe | ............. G02B 5/045 |
| | | | | 359/601 |
| 2015/0168610 | A1* | 6/2015 | Fukui | .................. B29C 33/3842 |
| | | | | 249/117 |
| 2015/0241603 | A1 | 8/2015 | Fujii et al. | |
| 2015/0362634 | A1* | 12/2015 | Iwase | ..................... G02B 1/118 |
| | | | | 359/601 |
| 2017/0299778 | A1* | 10/2017 | Kajiya | .................... G02B 1/118 |
| 2018/0050513 | A1 | 2/2018 | Mizuno et al. | |

FOREIGN PATENT DOCUMENTS

| | | | |
|---|---|---|---|
| CN | 107209286 A | 9/2017 | |
| EP | 2063314 A2 * | 5/2009 | ............. B32B 27/08 |
| JP | 2004-085831 A | 3/2004 | |
| JP | 2007-047701 A | 2/2007 | |
| JP | 2007-057622 A | 3/2007 | |
| JP | 2014-066976 A | 4/2014 | |
| KR | 10-1351596 B1 | 1/2014 | |
| TW | 201636645 A | 10/2016 | |
| WO | WO 2013/191091 A1 | 12/2013 | |
| WO | WO 2014/162374 A1 | 10/2014 | |
| WO | WO 2016/035776 A1 | 3/2016 | |
| WO | WO 2016/158550 A1 | 10/2016 | |
| WO | WO 2017/028948 A1 | 2/2017 | |
| WO | WO 2017/126673 A1 | 7/2017 | |

OTHER PUBLICATIONS

Sep. 27, 2021, Chinese Office Action issued for related CN Application No. 201880083625.5.

Jul. 26, 2022, Japanese Office Action issued for related JP Application No. 2017-249061.

Nov. 8, 2022, Taiwanese Office Action issued for related TW Application No. 107146631.

Oct. 31, 2023, Japanese Office Action issued for related JP Application No. 2022-170677.

* cited by examiner

Example 1

Example 2

Example 3

Example 4

Example 5

Example 8

Example 9

CONCAVE-CONVEX STRUCTURE, OPTICAL MEMBER, AND ELECTRONIC APPARATUS

CROSS REFERENCE TO PRIOR APPLICATION

This application is a National Stage Patent Application of PCT International Patent Application No. PCT/JP2018/046600 (filed on Dec. 18, 2018) under 35 U.S.C. § 371, which claims priority to Japanese Patent Application No. 2017-249061 (filed on Dec. 26, 2017), which are all hereby incorporated by reference in their entirety.

TECHNICAL FIELD

The present invention relates to a concave-convex structure, an optical member, and an electronic apparatus.

BACKGROUND ART

In recent years, optical members in which a concave-convex structure having an average cycle smaller than or equal to the wavelength of incident light is used have been widely developed. Since such a concave-convex structure exhibits properties principally different from those of a concave-convex structure having an average cycle larger than the wavelength of incident light, it is expected that an optical member having higher properties can be achieved.

For example, Patent Literature 1 below discloses a diffractive optical element in which a columnar feature having an average cycle smaller than or equal to the wavelength of incident light is formed as such a concave-convex structure. Patent Literature 1 below also discloses forming the diffractive optical element by performing exposure space-selectively using a laser interference exposure method.

CITATION LIST

Patent Literature

Patent Literature 1: JP 2007-57622A

SUMMARY OF INVENTION

Technical Problem

However, since the optical diffractive element disclosed in Patent Literature 1 above has a concave-convex structure formed by the laser interference exposure method, an arbitrary concave-convex structure other than the concave-convex structure corresponding to an interference pattern of laser light cannot be formed. In particular, the optical diffractive element disclosed in Patent Literature 1 above cannot take such a complicated concave-convex structure in which a plurality of concave-convex groups are further laid out, the concave-convex groups each including a plurality of concavities or convexities.

The present invention was therefore made in view of the above-described problems, and an object of the present invention is to provide a concave-convex structure including more complicated concave-convex structure, an optical member provided with the concave-convex structure, and an electronic apparatus provided with the concave-convex structure.

Solution to Problem

In order to solve the above-described problems, according to an aspect of the present invention, there is provided a concave-convex structure including a plurality of group portions each including a plurality of concavities or convexities provided in a surface of a base material, in which average widths of areas occupied by the concavities or convexities at the surface of the base material are smaller than or equal to a wavelength belonging to a visible light band.

Average widths in cross section of the concavities or convexities at a position away from the surface of the base material in a vertical direction by h/2 may be more than or equal to (a+b)/2, where a represents the average width of each of the areas occupied by the concavities or convexities at the surface of the base material, b represents an average width of each of bottom surfaces or top surfaces of the concavities or convexities opposite to the surface of the base material, and h represents a length of each of the concavities or convexities in the vertical direction with respect to the surface of the base material.

An average distance between the centers of gravity of adjacent ones of the concavities or convexities in each of the group portions may be more than or equal to $0.65(x_1/2+x_2/2)$ and less than or equal to $2.0(x_1/2+x_2/2)$, where $x_1$ and $x_2$ respectively represent the average widths of the areas occupied by the adjacent ones of the concavities or convexities at the surface of the base material.

Average widths of the group portions as a whole may be more than or equal to 0.2 μm.

The areas occupied by the concavities or convexities at the surface of the base material may have a generally circular shape.

In each of the group portions, each of lengths of the concavities or convexities in the vertical direction with respect to the surface of the base material may belong to any of at least two or more groups having different central values.

In each of the group portions, each of the average widths of the areas occupied by the concavities or convexities at the surface of the base material may belong to any of at least two or more groups having different central values.

Lengths of the concavities or convexities in the vertical direction with respect to the surface of the base material may be changed gradually within each of the group portions.

The average widths of the areas occupied by the concavities or convexities at the surface of the base material may be changed gradually within each of the group portions.

Lengths of the concavities or convexities in the vertical direction with respect to the surface of the base material may be changed irregularly within each of the group portions.

The average widths of the areas occupied by the concavities or convexities at the surface of the base material may be changed irregularly within each of the group portions.

The respective group portions may be laid out regularly.
The respective group portions may be laid out irregularly.
In each of the group portions, the respective concavities or convexities may be provided in a closest-packed arrangement.

In addition, in order to solve the above-described problems, according to another aspect of the present invention, there is provided an optical member in which the above-described concave-convex structure is used, or a transferred object obtained by transferring the concave-convex structure is used.

In addition, in order to solve the above-described problems, according to still another aspect of the present invention, there is provided an electronic apparatus in which the above-described concave-convex structure is used, or a transferred object obtained by transferring the concave-convex structure is used.

According to the above-described configuration, the arrangement and the vertical lengths of the concave-convex portions can be controlled with high accuracy and high reproducibility.

Advantageous Effects of Invention

According to the present invention as described above, a concave-convex structure including more complicated concave-convex structure, an optical member provided with the concave-convex structure, and an electronic apparatus provided with the concave-convex structure can be provided.

DESCRIPTION OF EMBODIMENTS

Figure 1A:
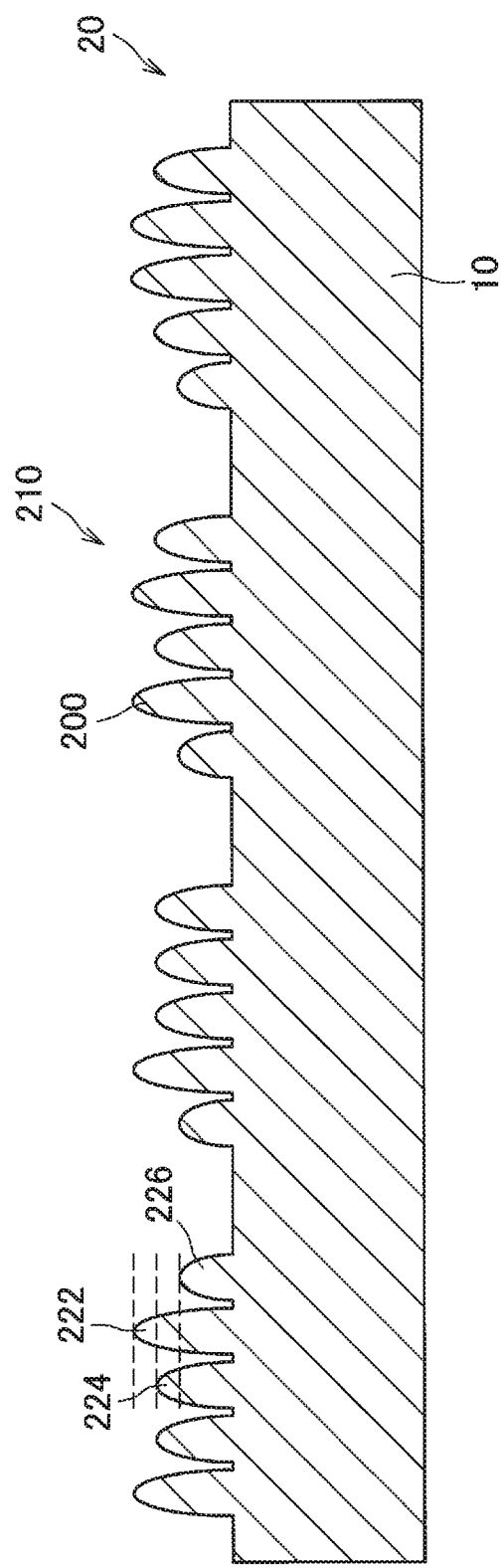
FIG. 1A shows a cross-sectional view obtained by cutting a base material in which a concave-convex structure is formed in a thickness direction.

Hereinafter, (a) preferred embodiment(s) of the present invention will be described in detail with reference to the appended drawings. Note that, in the present specification and the drawings, structural elements that have substantially the same function and structure are denoted with the same reference numerals, and repeated explanation is omitted.

<1. Configuration of Concave-Convex Structure>

Figure 1B:
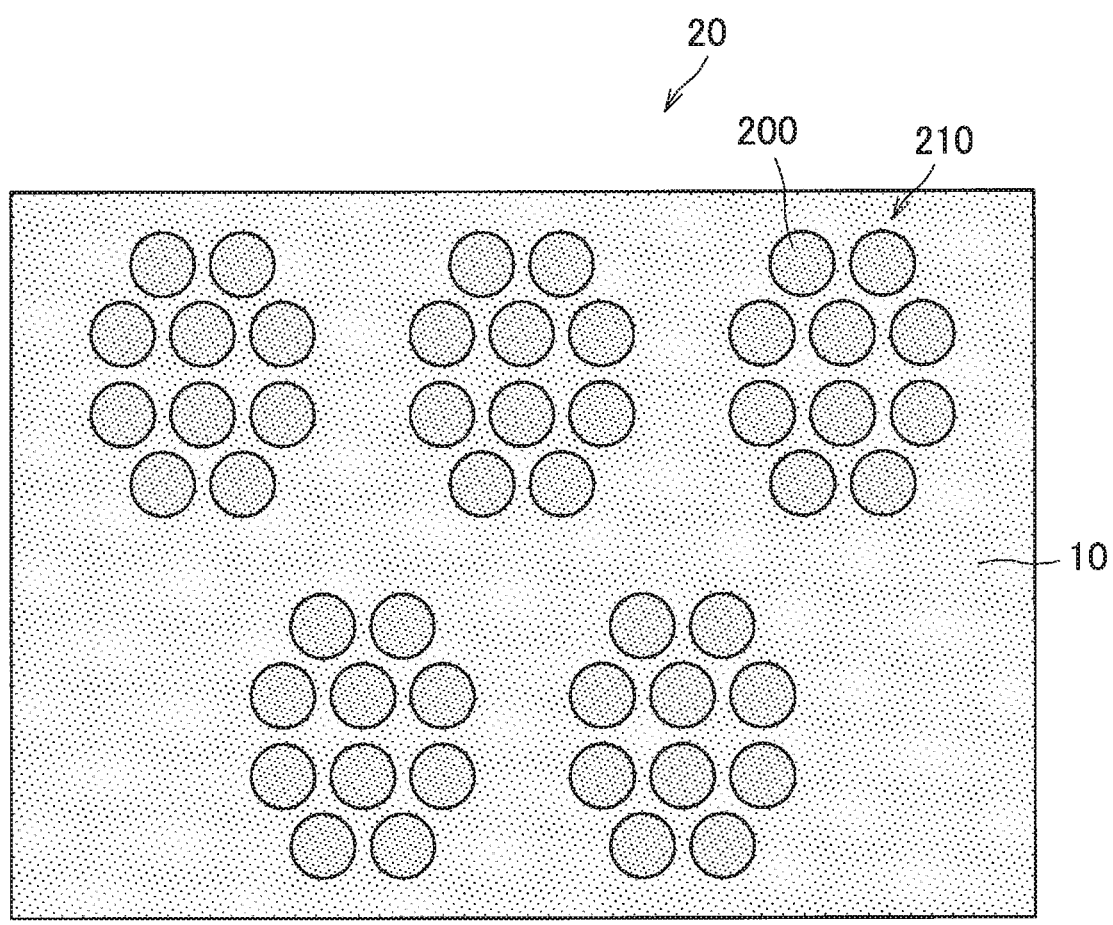
FIG. 1B shows a plan view of one main surface of the base material in which the concave-convex structure is formed, as seen in a vertical direction.

First, a configuration of a concave-convex structure according to an embodiment of the present invention will be described with reference to FIG. 1A and FIG. 1B. FIG. 1A is a cross-sectional view showing an example of a longitudinal configuration of the concave-convex structure according to the present embodiment, and FIG. 1B is a plan view showing an example of a planar configuration of the concave-convex structure according to the present embodiment. Note that FIG. 1A shows a cross-sectional view obtained by cutting a base material in which the concave-convex structure is formed in the thickness direction, and FIG. 1B shows a plan view of one main surface of the base material in which the concave-convex structure is formed, as seen in the vertical direction.

As shown in FIG. 1A and FIG. 1B, a concave-convex structure 20 includes a plurality of group portions 210 laid out on one main surface of a sheet-like base material 10, the group portions 210 each including a group of a plurality of concave-convex portions 200.

The concave-convex structure 20 is used as an optical member, for example. The concave-convex structure 20 may be used as an optical member for a light guide panel, a light diffuser panel, a microlens array, a Fresnel lens array, a diffraction grating, an anti-reflection film, or the like, for example. In addition, in the case of using the concave-convex structure 20 as an optical member, the concave-convex structure 20 may be used for an electronic apparatus such as a personal computer, laptop, television device, wearable device, smartphone, or tablet terminal, for example.

The base material 10 is made of a transparent material, for example. The base material 10 may be made of organic resin such as polycarbonate, polyethylene terephthalate, polymenthyl methacrylate, triacetylecellulose (TAC), cyclic olefin polymer (COP), or cyclic olefin copolymer (COC), or a transparent glass material such as quartz glass, soda lime glass, or lead glass, for example. Note that the term "transparent" indicates that transmittance of light having a wavelength belonging to a visible light band (approximately 360 nm to 830 nm) is high (for example, light transmittance is more than or equal to 70%).

Figure 2A:
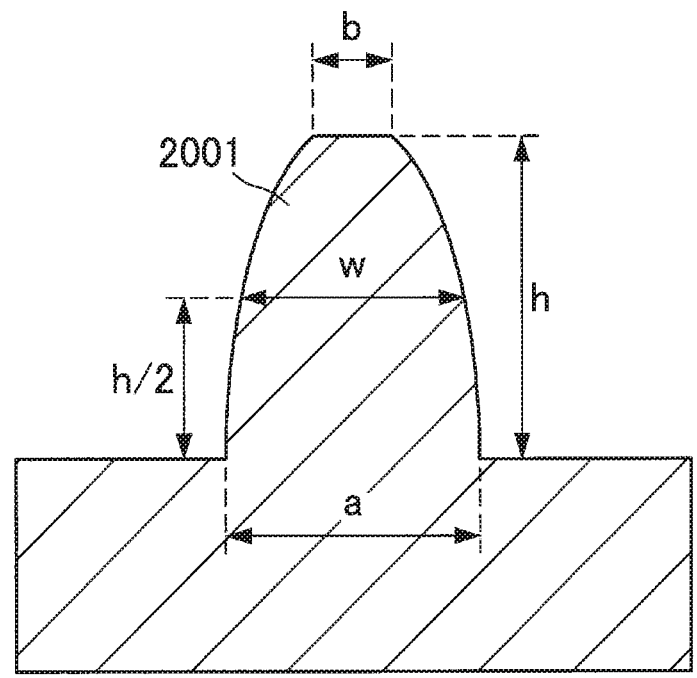
FIG. 2A is a cross-sectional view showing a specific configuration of a convexity which is an example of a concave-convex portion.
Figure 2B:
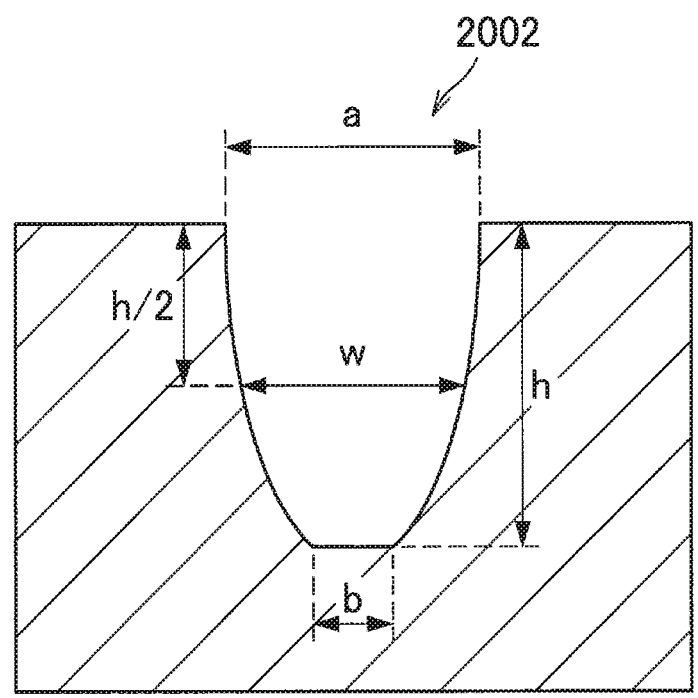
FIG. 2B is a cross-sectional view showing a specific configuration of a concavity which is another example of the concave-convex portion.

The concave-convex portion 200 has a concave shape recessed in the thickness direction of the base material 10 or a convex shape protruding in the thickness direction of the base material 10. Note that, although the drawings except FIG. 2B illustrate a convex shape alone as the concave-convex portion 200, the concave-convex portion 200 may obviously have a concave shape. A structure in which the concave-convex shape of such a concave-convex structure 20 is inverted can be formed efficiently by transferring the concave-convex shape to organic resin or the like using an imprinting technology in which the concave-convex structure 20 is used as a master (or replica master), for example.

The length of the concave-convex portion 200 in the vertical direction (that is, the depth of a concavity or the height of a convexity, which hereinafter will also be referred to as the vertical length) with respect to the surface of the base material 10 is provided to belong to any of at least two or more groups having different central values. For example, as shown in FIG. 1A, the concave-convex portion 200 may include a first convexity 222 having the longest vertical length, a third convexity 226 having the shortest vertical length, and a second convexity 224 having a vertical length intermediate between those of the first convexity 222 and the third convexity 226. The first convexity 222, the second convexity 224, and the third convexity 226 are provided such that their vertical lengths have differences larger than or equal to manufacturing variations, and the group portion 210 is provided to include a plurality of types of concave-convex portions 200 provided with different vertical lengths. That is, each of the concave-convex portions 200 may be formed under the control so as to have a desired vertical length, rather than being formed with a random vertical length. Note that the concave-convex portion 200 may obviously be provided with four or more types of vertical lengths.

Herein, the size of an area occupied by the concave-convex portion 200 at the surface of the base material 10 may be provided to be larger as the vertical length of the concave-convex portion 200 becomes longer. For example, the first convexity 222 may be formed to occupy the largest area at the surface of the base material 10, the third convexity 226 may be formed to occupy the smallest area at the surface of the base material 10, and the second convexity 224 may be formed to occupy an area at the surface of the base material 10 of a size intermediate between those of the first convexity 222 and the third convexity 226. That is, the concave-convex portion 200 may be provided to occupy a larger area at the surface of the base material 10 as the vertical length becomes longer. Therefore, the size of the area occupied by the concave-convex portion 200 at the surface of the base material 10 is also provided to belong to any of at least two or more groups having different central values.

Note that at least one or more types of each of the plurality of types of concave-convex portions 200 formed with different vertical lengths (in FIG. 1A, the first convexity 222, the second convexity 224, and the third convexity 226) should only be provided within a single group portion 210. For example, a single group portion 210 may be configured to include all of each of the first convexity 222, the second convexity 224, and the third convexity 226. Alternatively, a single group portion 210 may be configured to include any of the first convexity 222, the second convexity 224, and the third convexity 226. The provided number and arrangement of each of the first convexity 222, the second convexity 224, and the third convexity 226 within the group portion 210 can be controlled as appropriate on the basis of functions to be achieved by the group portions 210 or the concave-convex structure 20.

For example, the group portion 210 may be configured such that the vertical lengths of the concave-convex portions 200 are changed gradually within the group portion 210. That is, the group portion 210 may be provided such that the vertical lengths of the concave-convex portions 200 are changed gradually in a predetermined direction. Specifically, the vertical lengths of the concave-convex portions 200 may be changed to trace an arc in a predetermined direction or to be linear in the group portions 210 as a whole. Similarly, the group portion 210 may be configured such that the sizes or average widths of areas occupied by the concave-convex portions 200 at the surface of the base material 10 are also changed gradually.

Alternatively, for example, the group portion 210 may be configured such that the vertical lengths of the concave-convex portions 200 are changed irregularly. That is, the group portion 210 may be provided such that the vertical lengths of the concave-convex portions 200 are changed at random. Specifically, the vertical lengths of the concave-convex portions 200 may be changed in such a manner that regularity is not seen in the group portions 210 as a whole. Similarly, the group portion 210 may be configured such that the sizes or average widths of the areas occupied by the concave-convex portions 200 at the surface of the base material 10 are changed at random.

The group portion 210 includes a group of a plurality of concave-convex portions 200. For example, as shown in FIG. 1B, the group portion 210 may be configured by arranging the plurality of concave-convex portions 200 in a closest-packed manner, the concave-convex portions 200 each having a generally circular planar shape at the surface of the base material 10. In such a case, the average widths of the group portions 210 as a whole are formed to be at least more than or equal to 0.2 μm, for example, and may preferably be formed to be larger than a wavelength belonging to a visible light band. The respective group portions 210 may be spaced apart from each other at an interval wider than the interval between the respective concave-convex portions 200, and may be spaced apart from each other at an interval larger than the wavelength belonging to the visible light band, for example.

The planar shape of the area occupied by the concave-convex portion 200 at the surface of the base material 10 may be generally circular as described above, but may be elliptical, polygonal, or the like, for example. In addition, the arrangement of the concave-convex portions 200 in the group portion 210 may be the closest-packed arrangement as described above, but may be a rectangular lattice arrangement, hexagonal lattice arrangement, staggered lattice arrangement, or the like. The planar shape of the concave-convex portion 200 at the surface of the base material 10 and the arrangement of the concave-convex portions 200 in the group portion 210 can be controlled as appropriate on the basis of functions to be achieved by the group portions 210 or the concave-convex structure 20.

Each of the concave-convex portions 200 may be provided such that the average widths of the areas at the surface of the base material 10 are smaller than or equal to the wavelength belonging to the visible light band. In addition, similarly, the interval between the respective concave-convex portions 200 in the group portion 210 may be provided to be smaller than or equal to the wavelength belonging to the visible light band. Specifically, the average widths of the areas of and the interval between the concave-convex portions 200 may be more than or equal to 100 nm and less than or equal to 350 nm. In the case where the average widths of the areas of and the interval between the concave-convex portions 200 fall within the above-described range, the group portions 210 and the concave-convex structure 20 can function as what is called a moth-eye structure that restrains reflection of incident light belonging to the visible light band.

The respective group portions 210 may be laid out regularly. For example, as shown in FIG. 1B, the respective group portions 210 having identically configured and arranged concave-convex portions 200 may be laid out regularly at a predetermined interval. Alternatively, the respective group portions 210 may be laid out irregularly. For example, the respective group portions 210 may be laid out irregularly at a random-sized interval from each other. The layout of the respective group portions 210 can be controlled as appropriate on the basis of the functions to be achieved by the concave-convex structure 20.

<2. Configuration of Concavities or Convexities>

Next, a configuration of the concave-convex portion 200 in the group portion 210 will be described more specifically with reference to FIG. 2A to FIG. 4.

First, a specific configuration of the concave-convex portion 200 will be described with reference to FIG. 2A and FIG. 2B. FIG. 2A is a cross-sectional view showing a specific configuration of a convexity 2001 which is an example of the concave-convex portion 200, and FIG. 2B is a cross-sectional view showing a specific configuration of a concavity 2002 which is another example of the concave-convex portion 200. Note that, in FIG. 2A and FIG. 2B, the convexity 2001 and the concavity 2002 shall have a three-dimensional shape that is isotropic in an in-plain direction of the base material 10.

As shown in FIG. 2A, the convexity 2001 may be provided in a three-dimensional shape obtained by cutting a prolate spheroid around the pole and the equator by planes perpendicular to the rotation axis. In other words, the convexity 2001 may be provided in a bomb-like three-dimensional shape.

In FIG. 2A, the width of the convexity 2001 at the surface of the base material 10 is represented by a, the width of a flat surface of the top part of the convexity 2001 is represented by b, and the distance from the surface of the base material 10 to the flat surface of the top part of the convexity 2001 (that is, the height of the convexity 2001) is represented by h. At this time, the width w of the convexity 2001 at a height of h/2 from the surface of the base material 10 is preferably more than or equal to (a+b)/2. In addition, the width w of the convexity 2001 at the height of h/2 from the surface of the base material 10 is more preferably more than or equal to 1.2 times (a+b)/2.

In a case where the shape of the convexity 2001 satisfies the above-described condition, the convexity 2001 is provided in a three-dimensional shape whose outline extending from the surface of the base material 10 toward the top part bulges outward. The convexity 2001 having such a shape enables anti-reflection properties of the group portion 210 and the concave-convex structure 20 to be improved further. Note that, although the upper limit of w is not particularly limited, the upper limit of w is a, for example, when considering the shape of the convexity 2001. However, when considering the anti-reflection properties of the concave-convex structure 20, w is preferably less than or equal to 1.41 times (a+b)/2, for example. The upper limit of w can be selected as appropriate depending on the application of the concave-convex structure 20.

On the other hand, as shown in FIG. 2B, the concavity 2002 may be provided in a shape obtained by inverting the convexity 2001 shown in FIG. 2A upside down using the surface of the base material 10 as a symmetry plane. For example, the concavity 2002 may be provided in a bowl-like recessed shape having a flat bottom surface.

In FIG. 2B, the width of the concavity 2002 at the surface of the base material 10 is represented by a, the width of the flat surface of the bottom part of the concavity 2002 is represented by b, and the distance from the surface of the base material 10 to the flat surface of the bottom part of the concavity 2002 (that is, the depth of the concavity 2002) is represented by h. At this time, the width w of the concavity 2002 at the depth of h/2 from the surface of the base material 10 is preferably more than or equal to (a+b)/2, similarly to the case of the convexity 2001. In addition, the width w of the concavity 2002 at the depth of h/2 from the surface of the base material 10 is more preferably more than or equal to 1.2 times (a+b)/2, similarly to the case of the convexity 2001.

In a case where the shape of the concavity 2002 satisfies the above-described condition, the concavity 2002 is provided in a three-dimensional shape whose outline extending from the surface of the base material 10 toward the bottom part bulges outward. The group portion 210 including the concavity 2002 having such a shape and the concave-convex structure 20 enable anti-reflection properties of a transferred object obtained by inverting the concave-convex shape to be improved further. Note that, although the upper limit of w is not particularly limited, the upper limit of w is a, for example, when considering the shape of the concavity 2002. However, when considering the anti-reflection properties of the concave-convex structure 20, w is preferably less than or equal to 1.41 times (a+b)/2, for example. The upper limit of w can be selected as appropriate depending on the application of the concave-convex structure 20.

Figure 3:
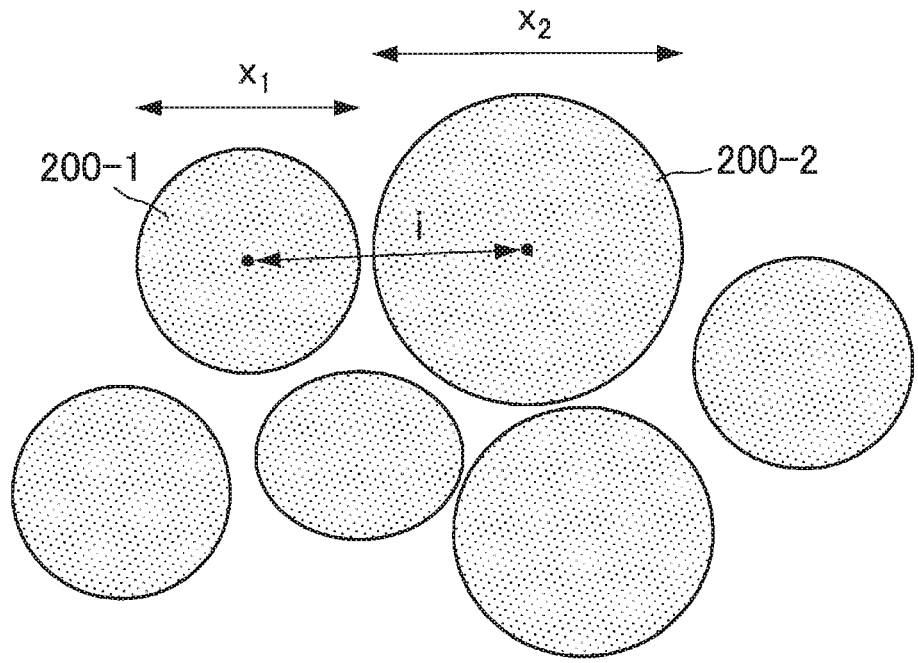
FIG. 3 is a plan view describing an arrangement interval between respective concave-convex portions.
Figure 4:
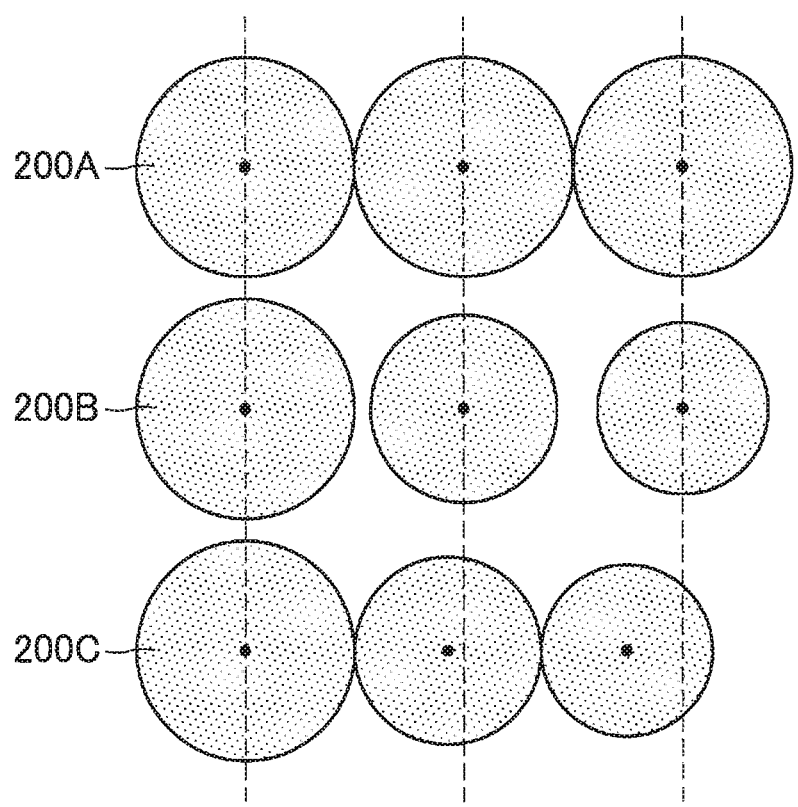
FIG. 4 is a schematic view showing an example of arrangement of concave-convex portions in a case where the concave-convex portions have the same size, or in a case where the concave-convex portions have different sizes.

Next, a specific configuration of the arrangement of the concave-convex portions 200 in the group portion 210 will be described with reference to FIG. 3 and FIG. 4. FIG. 3 is a plan view describing an arrangement interval between the respective concave-convex portions 200. FIG. 4 is a schematic view showing an example of the arrangement of the concave-convex portions 200 in each of a case in which the concave-convex portions 200 have the same size and a case in which the concave-convex portions 200 have different sizes.

The arrangement interval between adjacent concave-convex portions 200 will be described with reference to FIG. 3. As shown in FIG. 3, the width of a single concave-convex portion 200-1 at the surface of the base material 10 is represented by $x_1$, and the width of a concave-convex portion 200-2 adjacent to the concave-convex portion 200-1 at the surface of the base material 10 is represented by $x_2$. At this time, an average distance i between the center of gravity of the concave-convex portion 200-1 and the center of gravity of the concave-convex portion 200-2 is preferably more than or equal to $0.65(x_1/2+x_2/2)$ and less than or equal to $2.0(x_1/2+x_2/2)$. In addition, the average distance i between the center of gravity of the concave-convex portion 200-1 and the center of gravity of the concave-convex portion 200-2 is more preferably more than or equal to $0.8(x_1/2+x_2/2)$ and less than or equal to $1.2(x_1/2+x_2/2)$.

In a case where the average distance i between the centers of gravity of adjacent concave-convex portions 200 satisfies the above-described condition, the adjacent concave-convex portions 200 are provided with an appropriate overlap with each other or at an appropriate interval from each other. This enables the anti-reflection properties of the group portions 210 and the concave-convex structure 20 to be improved further. For example, in a case where the average distance i between the centers of gravity is less than $0.65(x_1/2+x_2/2)$, the overlap between the adjacent concave-convex portions 200 becomes excessively large, so that substantial vertical lengths of the concave-convex portions 200 decrease, and the anti-reflection properties of the group portions 210 and the concave-convex structure 20 degrade, which is not preferable. In addition, in a case where the average distance i between the centers of gravity exceeds $2.0(x_1/2+x_2/2)$, the interval between the adjacent concave-convex portions 200 becomes excessively large, so that the flat surface between the concave-convex portions 200 increases, and the anti-reflection properties of the group portions 210 and the concave-convex structure 20 degrade, which is not preferable.

Note that, in a case where the concave-convex portion 200 has a circular or elliptical planar shape at the surface of the base material 10, the above-described $x_1$ and $x_2$ may be the diameter or long radius of circle or ellipse of the planar shape of the concave-convex portion 200. In addition, in such a case, the center of gravity of the concave-convex portion 200 may be the center of circle or ellipse of the planar shape of the concave-convex portion 200. On the other hand, in a case where the concave-convex portion 200 has a polygonal planar shape at the surface of the base material 10, the above-described $x_1$ and $x_2$ may be the diameter of a circumscribed circle of polygon of the planar shape of the concave-convex portion 200. In addition, in such a case, the center of gravity of the concave-convex portion 200 may be the center of the circumscribed circle of the planar shape of the concave-convex portion 200.

The interval between a plurality of respective concave-convex portions 200 will be described with reference to FIG. 4. As shown in FIG. 4, in a case where the areas occupied by the concave-convex portions 200 at the surface of the base material 10 have a generally constant size (in the case of concave-convex portions 200A), for example, the concave-convex portions 200A may be provided at the same interval as the size of the areas occupied by the concave-convex portions 200 at the surface of the base material 10 so as to achieve a closest-packed arrangement.

For example, in a case where the areas occupied by the concave-convex portions 200 at the surface of the base material 10 vary in size (in the case of concave-convex portions 200B), the concave-convex portions 200B may be provided at a constant interval. In such a case, the concave-convex portions 200B are easy to form even though the concave-convex portions 200B do not achieve a closest-packed arrangement.

For example, in a case where the areas occupied by the concave-convex portions 200 at the surface of the base material 10 vary in size (in the case of concave-convex portions 200C), the concave-convex portions 200C may be provided at an interval controlled in accordance with the size of the area occupied by each of the concave-convex portions 200 at the surface of the base material 10. In such a case, the concave-convex portions 200C can achieve a closest-packed arrangement even in the case where the areas occupied by the concave-convex portions 200 at the surface of the base material 10 vary in size. According to the present embodiment, the arrangement of the respective concave-convex portions 200 and the sizes at the surface of the base material 10 can be controlled with high accuracy. Therefore, even in the case where the areas occupied by the concave-convex portions 200 at the surface of the base material 10 vary in size (in the case of the concave-convex portions 200C), the concave-convex portions 200 can be formed in a closest-packed arrangement.

As described above, the concave-convex portions 200 of the concave-convex structure 20 are formed with a plurality of types of different vertical lengths. That is, the vertical length of the concave-convex portion 200 is provided to belong to any of a plurality of groups having different central values. Therefore, in the concave-convex structure 20, the vertical length of each of the concave-convex portions 200 is controlled with high accuracy so as to be a predetermined vertical length for each of the concave-convex portions 200. In addition, the concave-convex structure 20 is provided such that the group portions 210 each including a plurality of concave-convex portions 200 are spaced apart from each other. Thus, the formed positions of the concave-convex portions 200 are controlled with high accuracy such that the interval within the group portion 210 and the interval between the group portions 210 are different. Therefore, the concave-convex structure 20 according to the present embodiment can include a more complicated concave-convex shape.

<3. Specific Examples of Concave-Convex Structure>

Next, specific examples of the concave-convex structure 20 according to the present embodiment will be described with reference to FIG. 5 to FIG. 9. FIG. 5 to FIG. 9 each include a cross-sectional view and a plan view schematically showing an example of the concave-convex structure 20 according to the present embodiment. Note that the plan views in FIG. 5 to FIG. 9 illustrate that circles shown in denser dot hatching correspond to higher convexities.

First Specific Example

Figure 5:
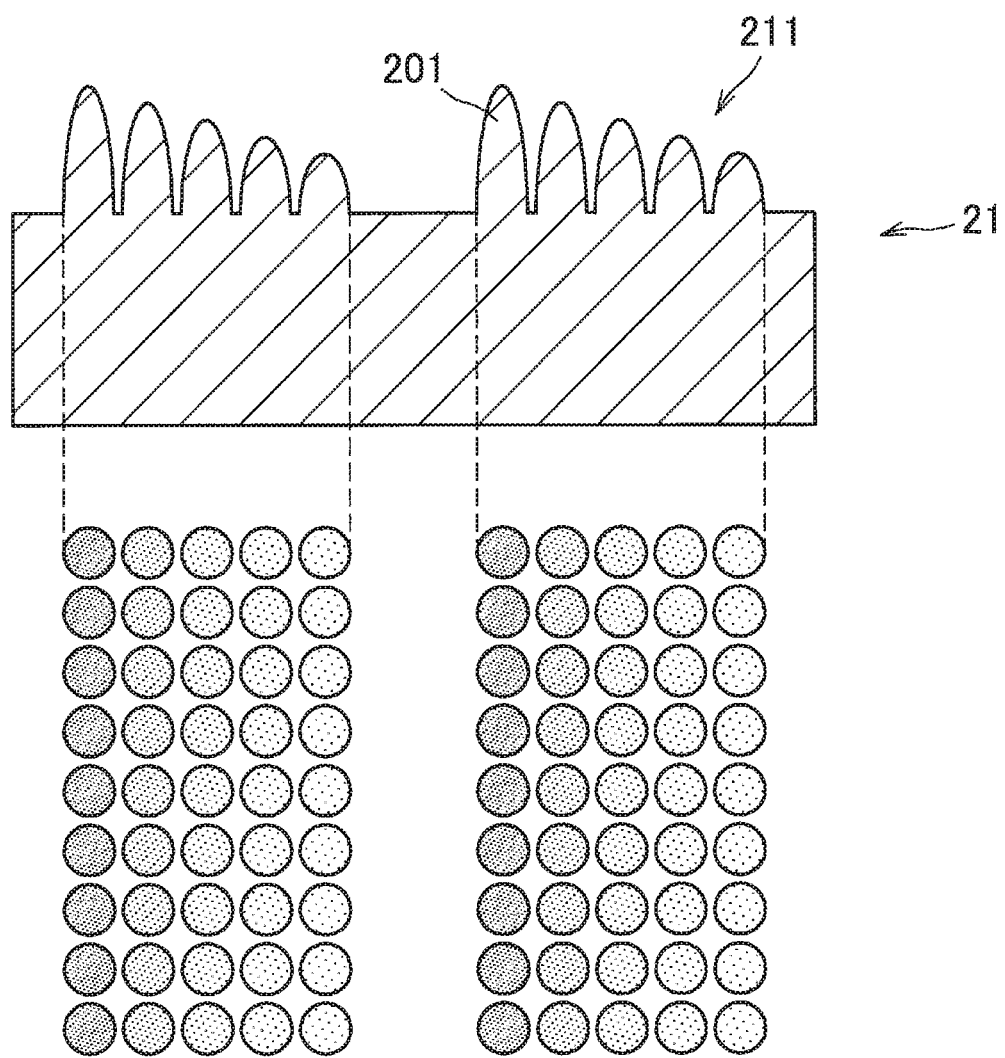
FIG. 5 includes a cross-sectional view and a plan view schematically showing an example of the concave-convex structure.

As shown in FIG. 5, a concave-convex structure 21 may be structured such that group portions 211, each including convexities 201 laid out in the form of a rectangular lattice, are provided at a predetermined interval. In the concave-convex structure 21, the group portions 211 are provided such that the heights of the convexities 201 in each of the group portions 211 increase or decrease gradually in a first direction, and such that in a second direction perpendicular to the first direction, the heights of the convexities 201 are generally equal. Therefore, in the concave-convex structure 21 shown in FIG. 5, the group portions 211 may be formed as a structure presenting a triangular wave-like (sawtooth-like) shape as a whole in the first direction. Such a concave-convex structure 21 can be used as a diffractive element having an anti-reflection function by means of a moth-eye structure, for example.

Second Specific Example

Figure 6:
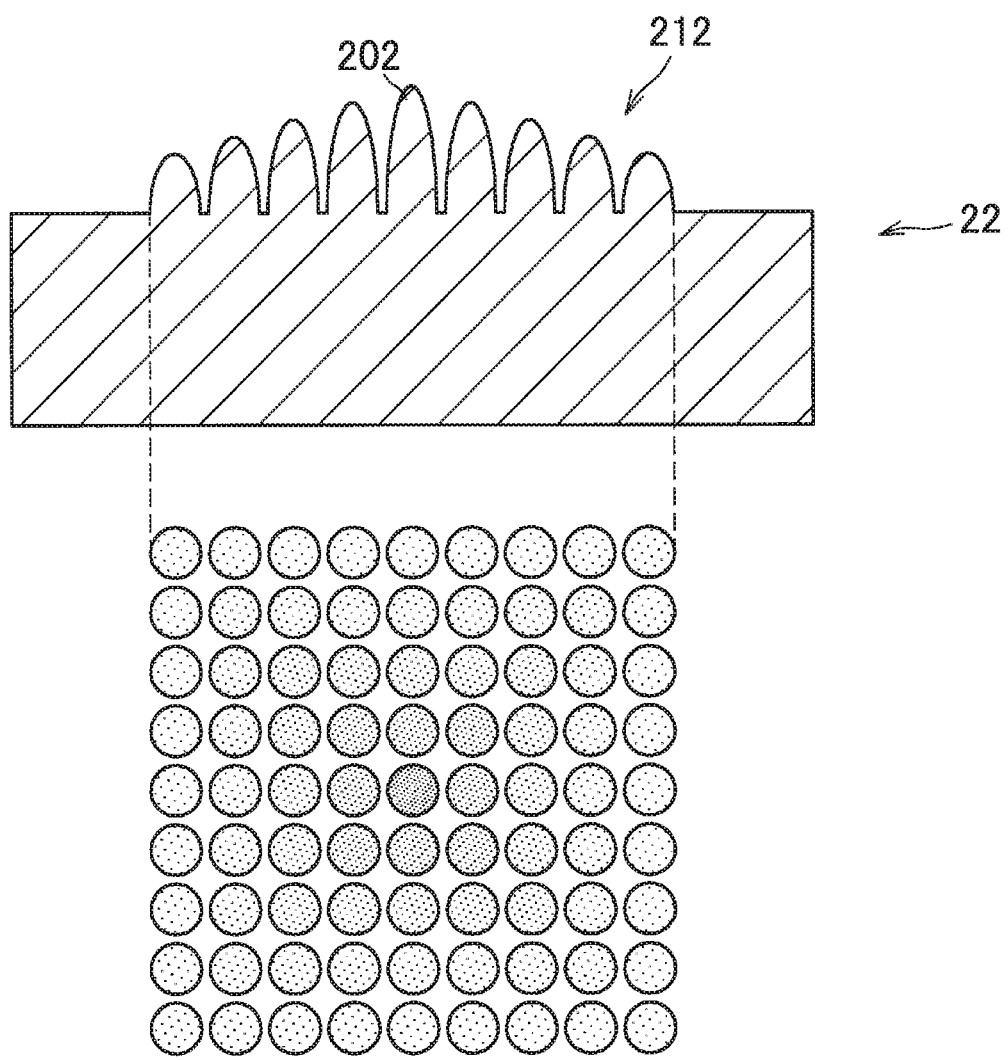
FIG. 6 includes a cross-sectional view and a plan view schematically showing another example of the concave-convex structure.

As shown in FIG. 6, a concave-convex structure 22 may be structured such that group portions 212, each including convexities 202 laid out in the form of a rectangular lattice, are provided at a predetermined interval. In the concave-convex structure 22, the group portion 212 is provided such that the heights of the convexities 202 in the group portion 212 increase gradually toward the center of the group portion 212. Therefore, in the concave-convex structure 22 shown in FIG. 6, the group portions 212 may be formed as a structure presenting a convex lens-like shape as a whole. Such a concave-convex structure 22 can be used as a microlens array having an anti-reflection function by means of a moth-eye structure, for example.

Third Specific Example

Figure 7:
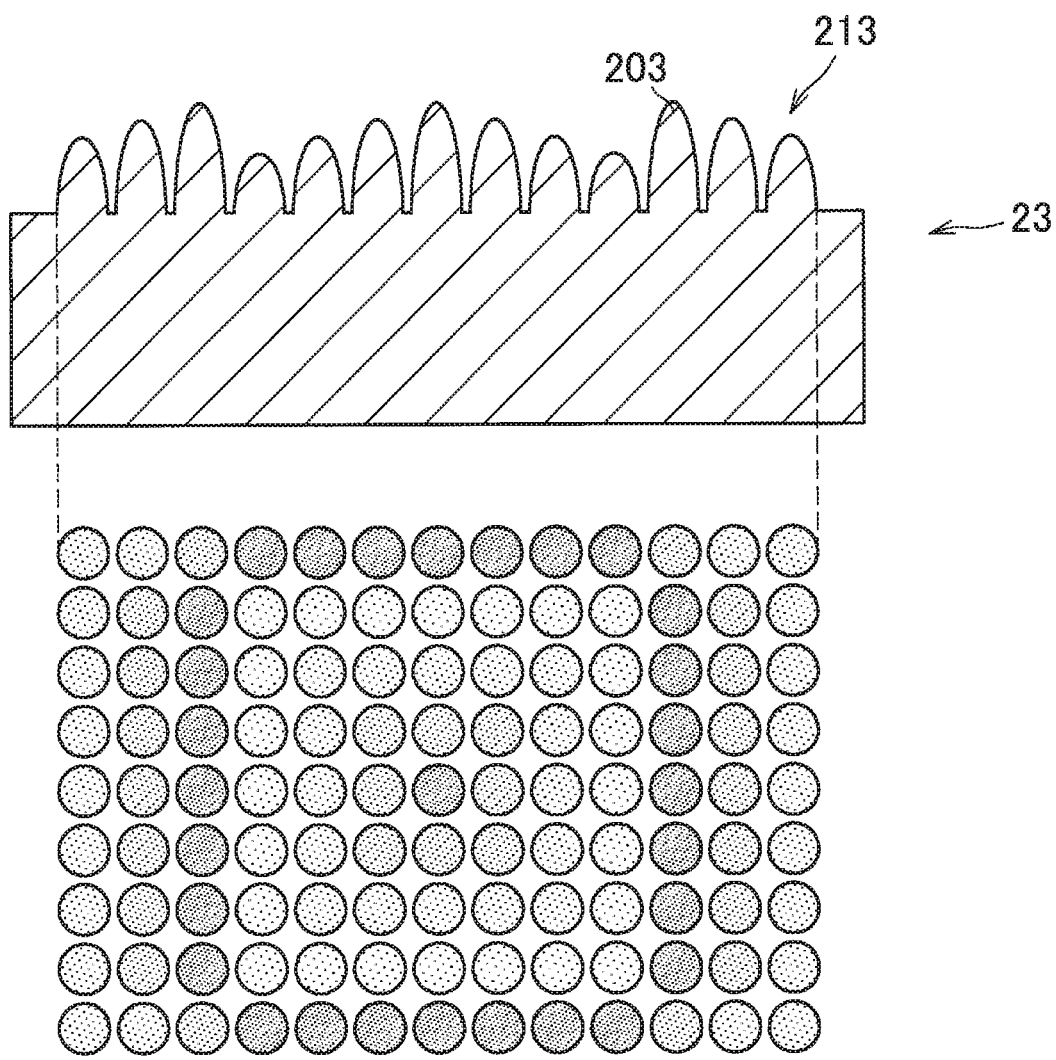
FIG. 7 includes a cross-sectional view and a plan view schematically showing another example of the concave-convex structure.

As shown in FIG. 7, a concave-convex structure 23 may be structured such that group portions 213, each including convexities 203 laid out in the form of a rectangular lattice, are provided at a predetermined interval. In the concave-convex structure 23, the group portion 213 is provided such that the heights of the convexities 203 in the group portion 213 increase gradually toward the center of the group portion 213, and provided in such a shape that the heights of the convexities 203 decrease concentrically so as to fall within a predetermined range. Therefore, in the concave-convex structure 23 shown in FIG. 7, the group portions 213 may be formed as a structure presenting a Fresnel lens-like shape as a whole. Such a concave-convex structure 23 can be used as a Fresnel lens array having an anti-reflection function by means of a moth-eye structure, for example.

Fourth Specific Example

Figure 8:
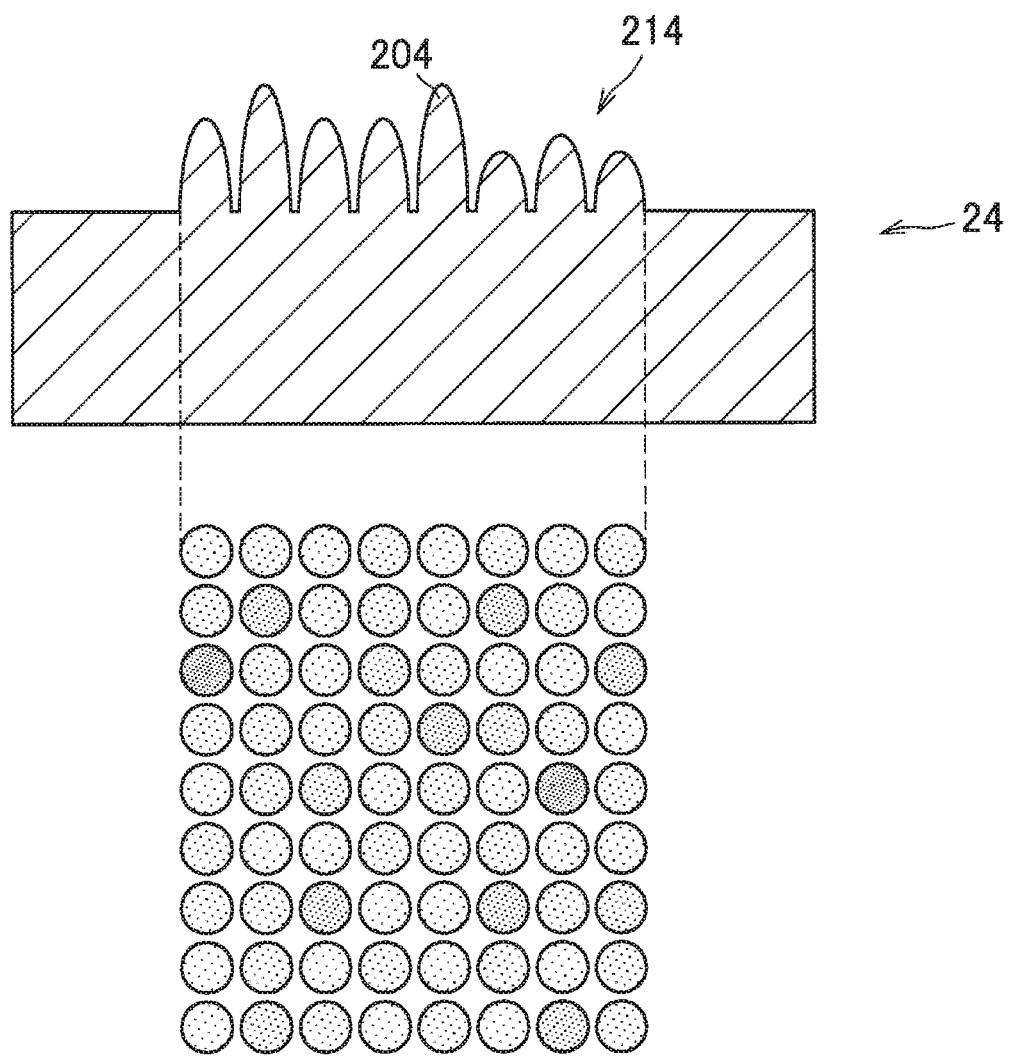
FIG. 8 includes a cross-sectional view and a plan view schematically showing another example of the concave-convex structure.

As shown in FIG. 8, a concave-convex structure 24 may be structured such that group portions 214, each including convexities 204 laid out in the form of a rectangular lattice, are provided at a predetermined interval. In the concave-convex structure 24, the group portion 214 is provided such that the heights of the convexities 204 in the group portion 214 are irregular (random). However, more strictly saying, the convexities 204 having different heights are arranged irregularly (at random) in the group portion 214 because the heights of the convexities 204 are provided to belong to any of a plurality of groups having different central values. Therefore, in the concave-convex structure 24 shown in FIG. 8, the group portions 214 may be formed as a moth-eye structure in which the heights of the convexities 204 are irregular as a whole. Such a concave-convex structure 24 can be used as an anti-reflection film or a light diffuser panel that produces less interfering light and diffracted light, for example.

Fifth Specific Example

Figure 9:
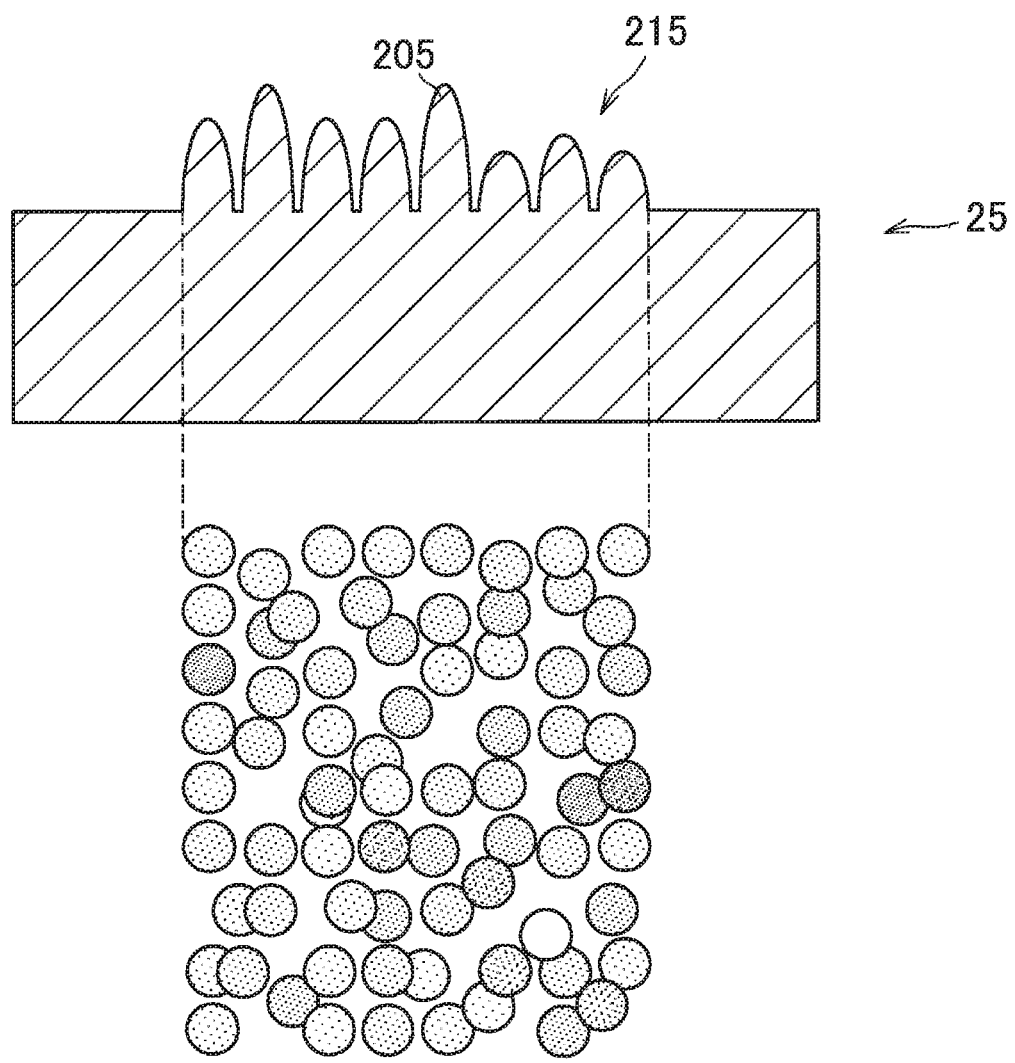
FIG. 9 includes a cross-sectional view and a plan view schematically showing another example of the concave-convex structure.

As shown in FIG. 9, a concave-convex structure 25 may be structured such that group portions 215, each including convexities 205 laid out in an irregular (random) arrangement, are provided at a predetermined interval. In the concave-convex structure 25, the group portion 215 is provided such that the convexities 205 having different heights are arranged irregularly (at random) in the group portion 215, similarly to the concave-convex structure 24 shown in FIG. 8. Therefore, in the concave-convex structure 25 shown in FIG. 9, the group portions 215 may be formed as a moth-eye structure in which the heights and arrangement of the convexities 205 are irregular as a whole. The concave-convex structure 25 can be used as an anti-reflection film or a light diffuser panel that produces still less interfering light and diffracted light, for example. Note that the occurrence of unintended diffracted light or interfering light can be restrained further because the concave-convex structure 25 shown in FIG. 8 has a lower regularity than the concave-convex structure 24 shown in FIG. 8.

<4. Method of Producing Concave-Convex Structure>

Subsequently, a method of producing the concave-convex structure 20 according to the present embodiment will be described briefly.

The concave-convex structure 20 according to the present embodiment can be produced by forming a resist pattern corresponding to the concave-convex portions on the outer peripheral surface of the base material 10 using thermal lithography with laser light, and then etching the base material 10 using the resist pattern as a mask.

Alternatively, the concave-convex structure 20 according to the present embodiment can be produced using a publicly-known micromachining technology such as electron lithography through use of an electron beam lithography device or the like, multi-patterning through use of photolithography, or ultrafine cutting through use of a diamond cutting tool.

Furthermore, the concave-convex structure 20 according to the present embodiment can be produced by the imprinting technology using the concave-convex structure 20 formed by the above-described production method as a master. Specifically, by pressing the concave-convex structure 20 (that is, the master) against sheet-like resin or the like to transfer the concave-convex shape on the surface, a transferred object having a concave-convex shape inverted from that of the master can be produced.

EXAMPLES

Hereinafter, concave-convex structures according to the present embodiment will be described further specifically with reference to examples and a comparative example. Note that the examples described below are conditional examples for presenting practicability and effects of the concave-convex structures according to the present embodiment and a method of producing them, and the concave-convex structures according to the present embodiment and the method of producing them are not limited to those of the following examples.

Examples 1 to 9

Masters corresponding to concave-convex structures according to Examples 1 to 9 were fabricated through the following steps, and transferred objects (the concave-convex structures according to Examples 1 to 9) of the fabricated masters were fabricated using the imprinting technology.

Specifically, first, a tungsten oxide was deposited in 55 nm by sputtering on the outer peripheral surface of a base material (having an axial length of 100 mm, and a thickness of the outer peripheral surface of 4.5 mm) made of cylindrical quartz glass to form a resist layer. Next, thermal lithography was performed with laser light from a semiconductor laser light source having a wavelength of 405 nm using an exposure device to form a latent image corresponding to each of Examples 1 to 9 on the resist layer.

Subsequently, the base material after exposure was subject to development processing at 27° C. for 900 seconds using a 2.38% by mass aqueous solution of tetramethylammonium hydroxide (TMAH) (available from TOKYO OHKA KOGYO CO., LTD.) to dissolve the resist layer at the latent image portion, and concave-convex portions corresponding to each of Examples 1 to 9 was formed in the resist layer. Next, using the resist layer after development as a mask, reactive ion etching (RIE) was performed at a gas pressure of 0.5 Pa and input power of 150 W using $CHF_3$ gas (30 sccm) to etch the base material for 30 minutes. Thereafter, the remaining resist layer was removed.

The master having the concave-convex portions formed on the outer peripheral surface was fabricated through the above steps, and a transferred object was fabricated using the fabricated master. Specifically, the concave-convex portions formed on the outer peripheral surface of the master was transferred to ultra-violet curing resin using a transfer device to fabricate transferred objects according to Examples 1 to 9. Note that a polyethylene terephthalate (PET) film was used as a sheet-like base material of the transferred object, and the ultra-violet curing resin was cured by emitting ultra-violet rays of 1000 $mJ/cm^2$ for a minute with a metal halide lamp.

Comparative Example 1

A transferred object (a concave-convex structure according to Comparative Example 1) was fabricated by a method similar to that of Examples 1 to 9 except that a latent image corresponding to Comparative Example 1 was formed on a resist layer using photolithography through exposure using a mask.

Figure 10A:
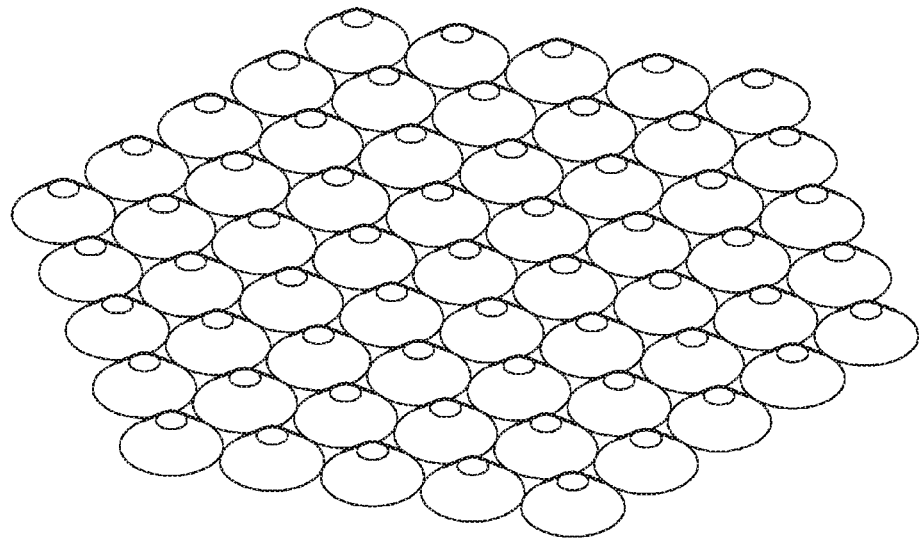
FIG. 10A is a schematic perspective view of group portions in concave-convex structures according to Examples 1 to 9.
Figure 10B:
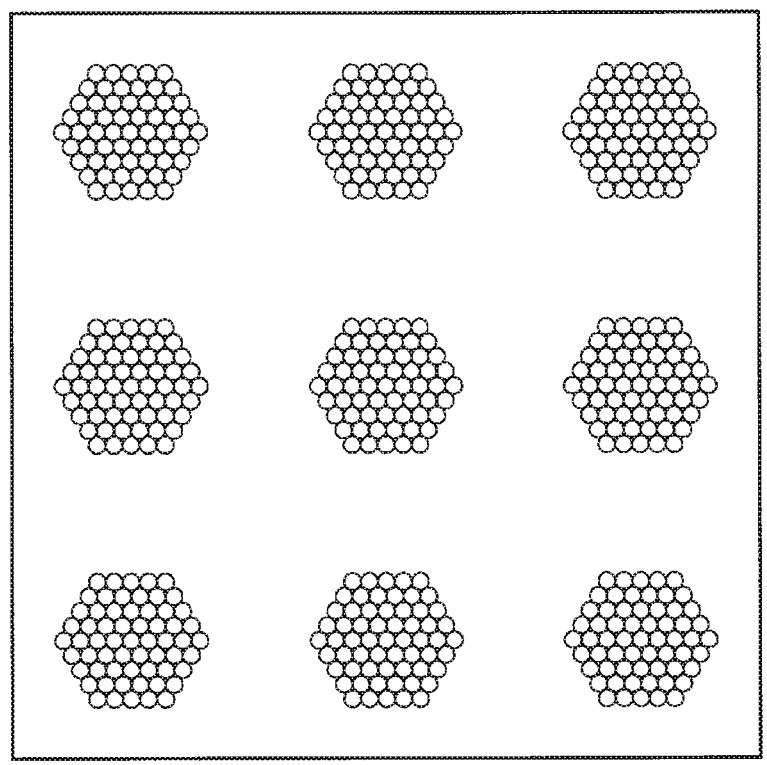
FIG. 10B is a schematic plan view of the concave-convex structures according to Examples 1 to 9.
Figure 11A:
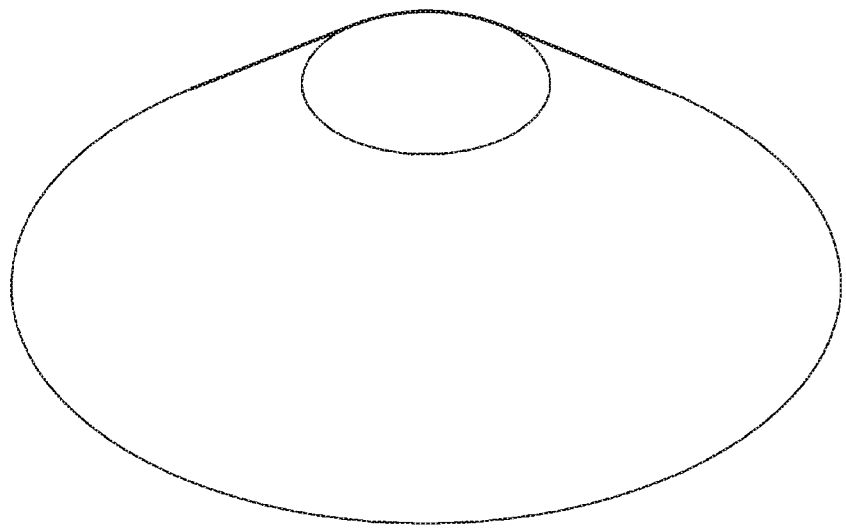
FIG. 11A is a schematic perspective view of group portions in a concave-convex structure according to Comparative Example 1.
Figure 11B:
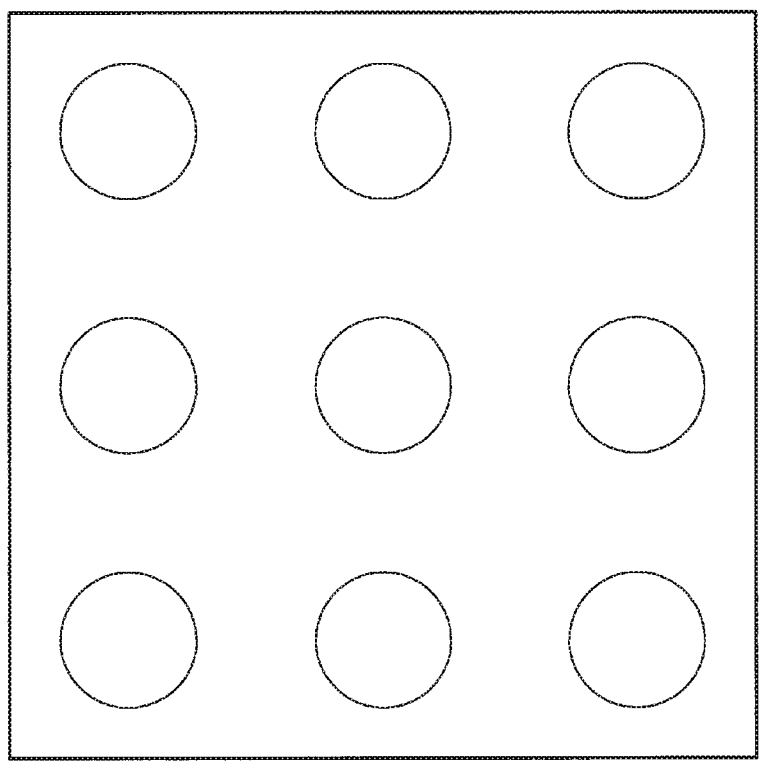
FIG. 11B is a schematic plan view of the concave-convex structure according to Comparative Example 1.
Figure 12A:
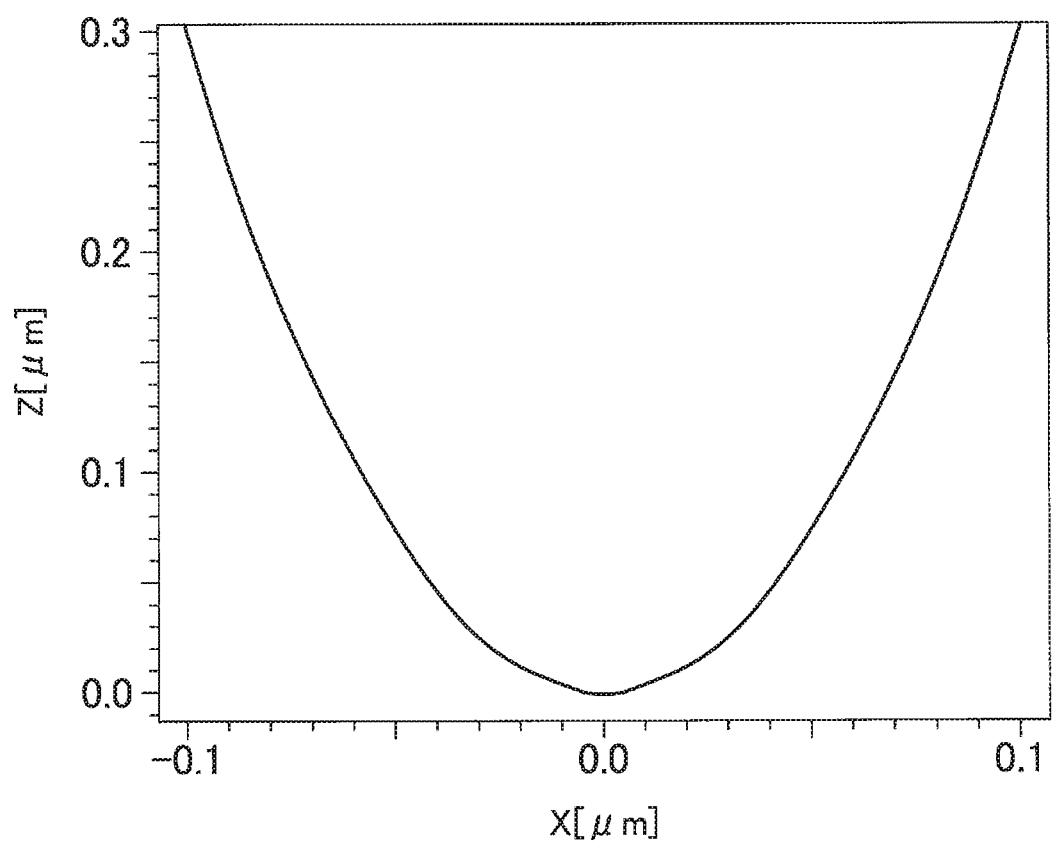
FIG. 12A is an explanatory diagram showing a schematic cross-sectional shape of a convexity in Example 1.
Figure 12B:
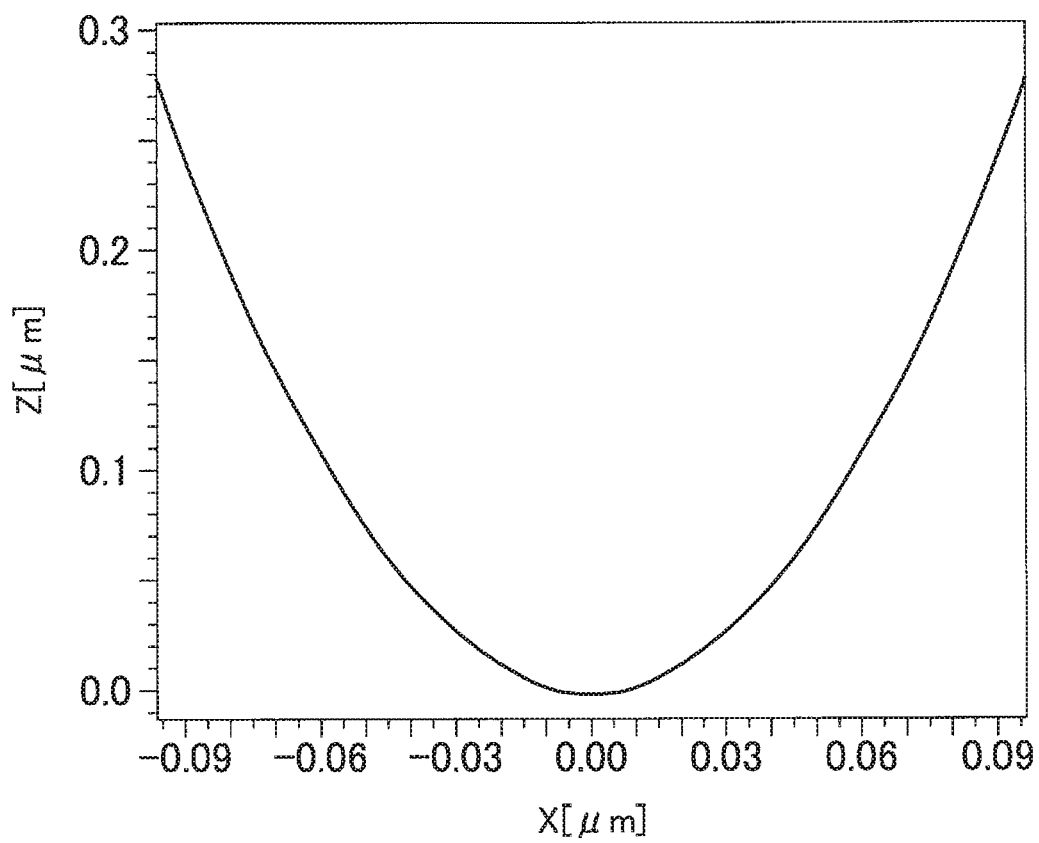
FIG. 12B is an explanatory diagram showing a schematic cross-sectional shape of a convexity in Example 2.
Figure 12C:
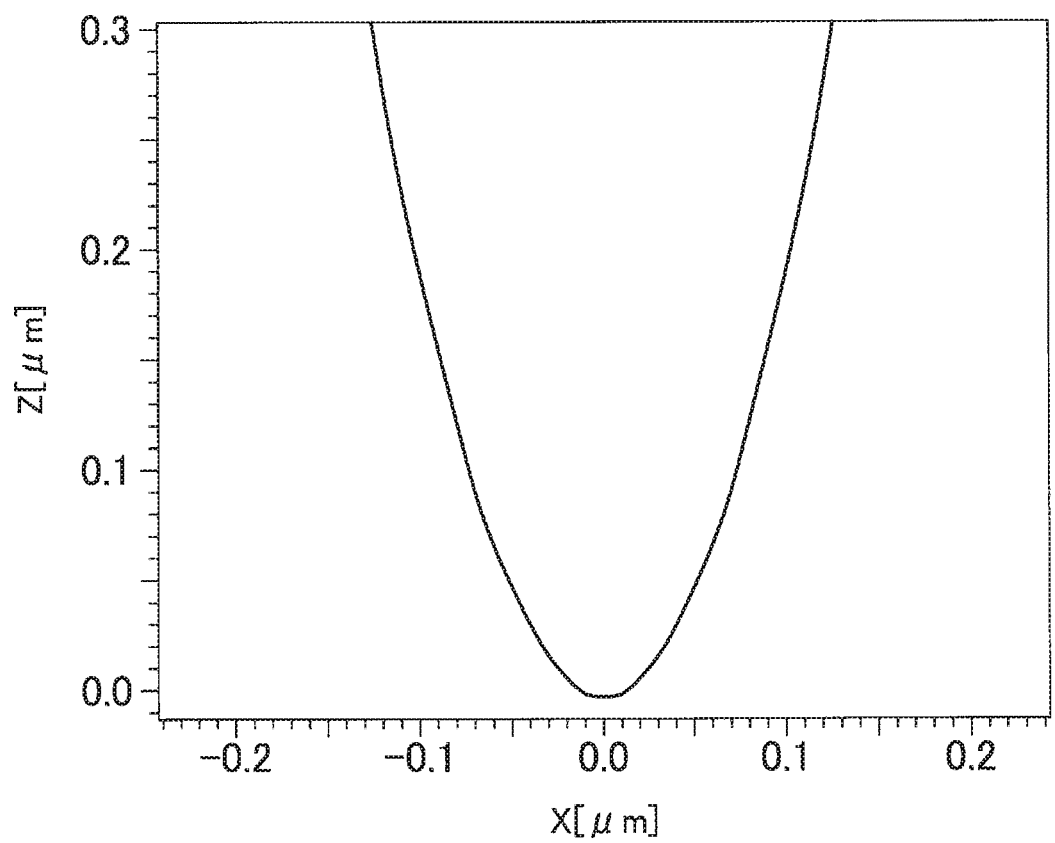
FIG. 12C is an explanatory diagram showing a schematic cross-sectional shape of a convexity in Example 3.
Figure 12D:
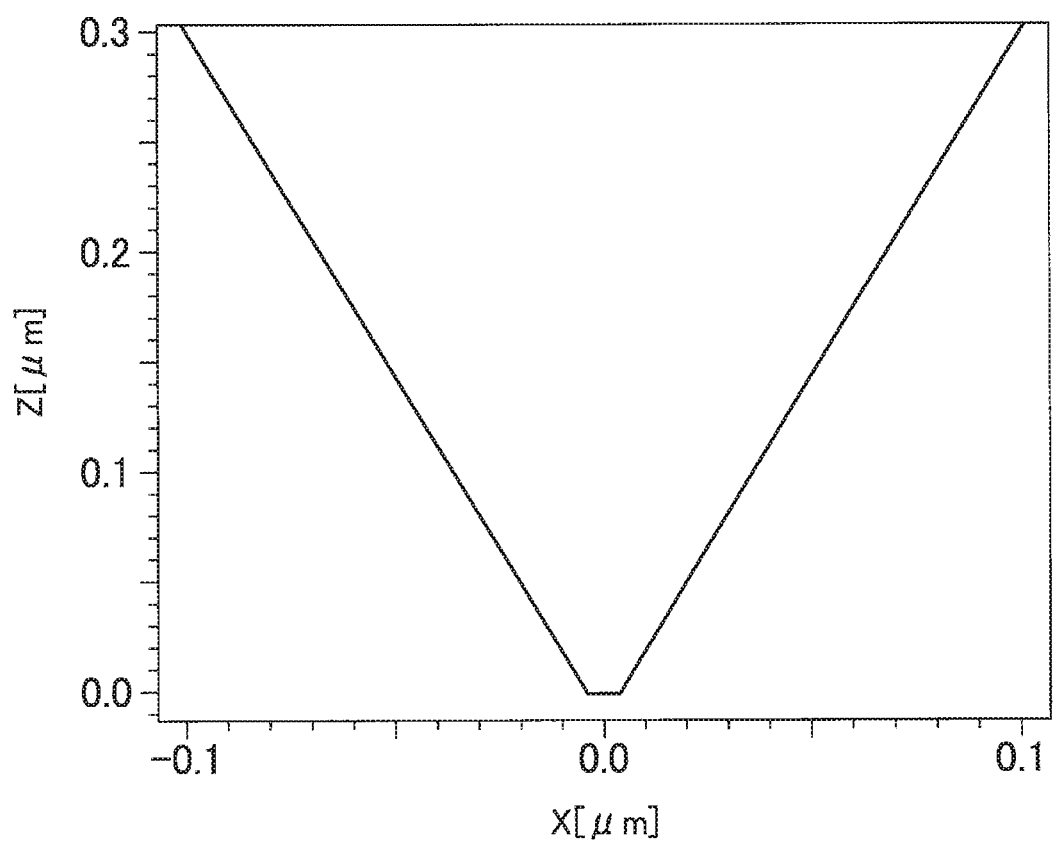
FIG. 12D is an explanatory diagram showing a schematic cross-sectional shape of a convexity in Example 4.
Figure 12E:
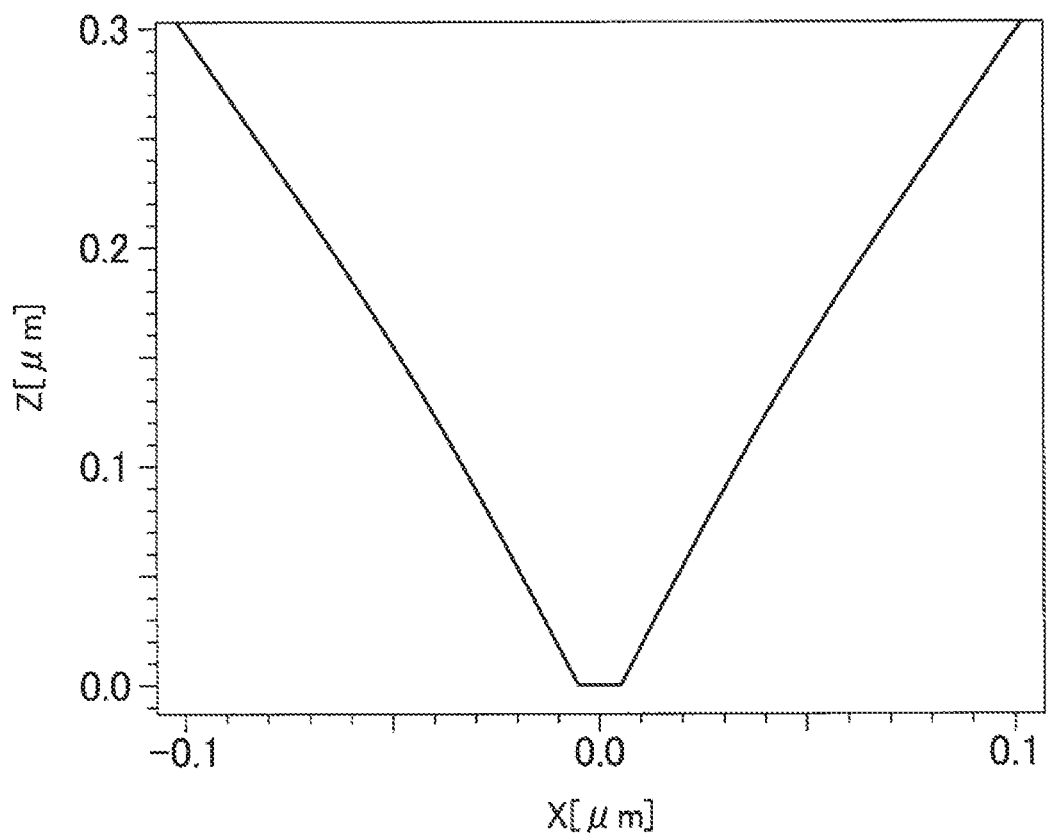
FIG. 12E is an explanatory diagram showing a schematic cross-sectional shape of a convexity in Example 5.
Figure 12F:
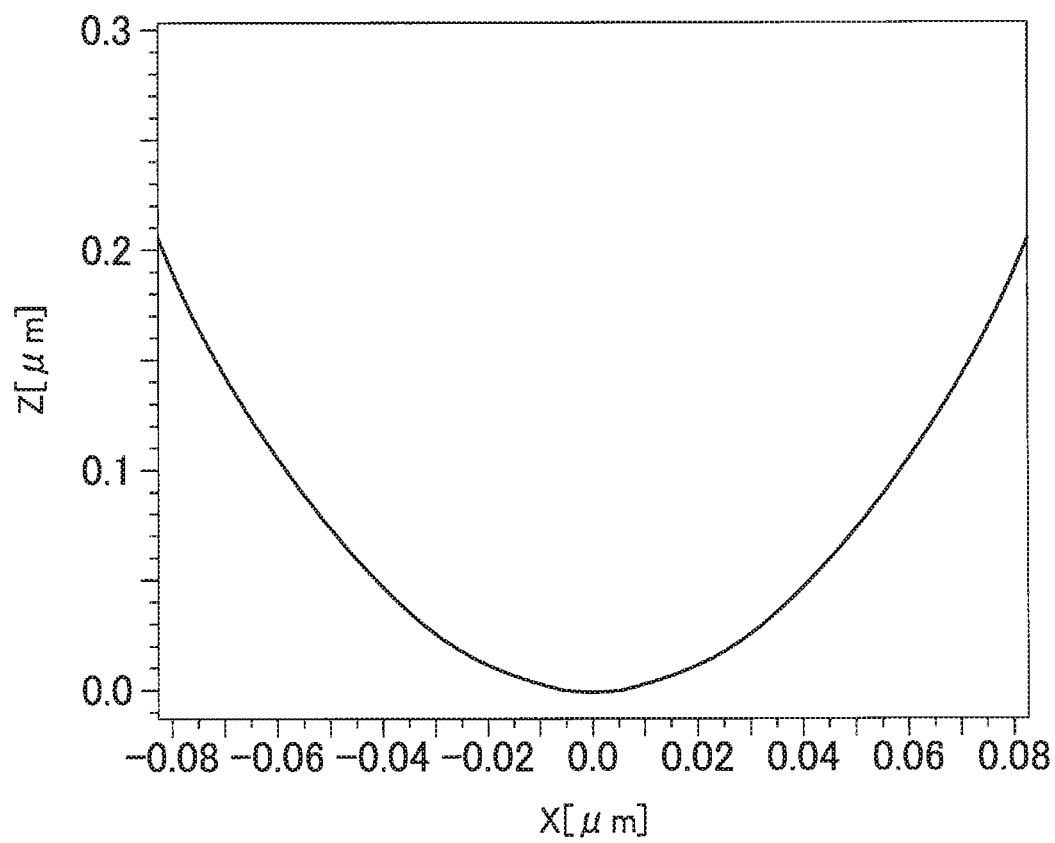
FIG. 12F is an explanatory diagram showing a schematic cross-sectional shape of a convexity in Example 8.
Figure 12G:
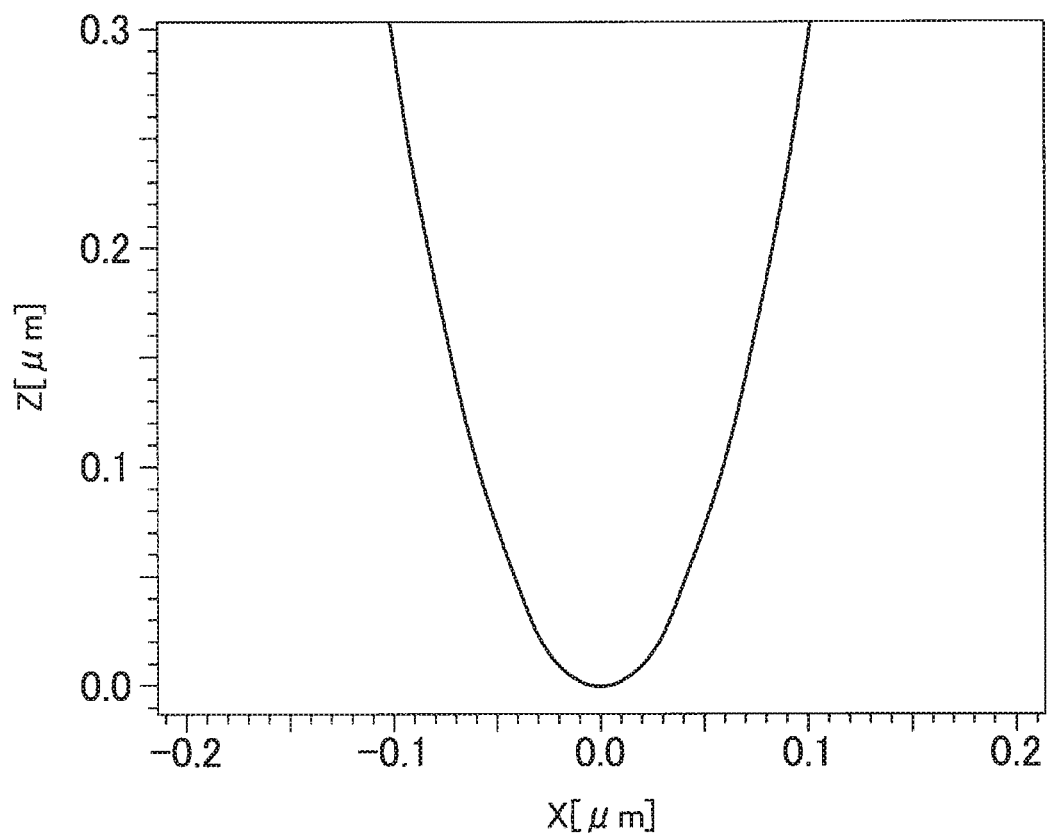
FIG. 12G is an explanatory diagram showing a schematic cross-sectional shape of a convexity in Example 9.

Herein, a schematic shape of the concave-convex portions formed on the concave-convex structures according to Examples 1 to 9 is shown in FIG. 10A and FIG. 10B, and a schematic shape of concave-convex portions formed on the concave-convex structure according to Comparative Example 1 is shown in FIG. 11A and FIG. 11B. FIG. 10A is a schematic perspective view of group portions in the concave-convex structures according to Examples 1 to 9, and FIG. 10B is a schematic plan view of the concave-convex structures according to Examples 1 to 9. FIG. 11A is a schematic perspective view of the group portion in the concave-convex structure according to Comparative Example 1, and FIG. 11B is a schematic plan view of the concave-convex structure according to Comparative Example 1.

As shown in FIG. 10A and FIG. 10B, the concave-convex structures according to Examples 1 to 9 are provided by laying out a plurality of group portions each including a group of a plurality of convexities. Specifically, the concave-convex structures are provided by laying out respective group portions in a manner spaced apart from each other, the group portions each including convexities protruding from the surface of the base material in the vertical direction so as to achieve a closest-packed arrangement on a plane. By providing convexities located closer to the center to become gradually higher, the group portions are provided to present a convex lens-like shape as a whole.

Herein, the concave-convex structures according to Examples 1 to 9 are different from each other in terms of the three-dimensional shape of convexities and the average distance between the centers of gravity of adjacent convexities, as shown in Table 1 below. However, the concave-convex structures according to Examples 1 to 9 are provided to present an identical convex lens-like shape as a whole.

As shown in FIG. 11A and FIG. 11B, the concave-convex structure according to Comparative Example 1 is provided by laying out a plurality of single convexities protruding from the surface of the base material in the vertical direction. Specifically, the concave-convex structure is provided by cutting cones by a plane parallel to the bottom surfaces, and laying out truncated cone shapes excluding small conic portions in a manner spaced apart from each other. Therefore, the concave-convex structure according to Comparative Example 1 and the concave-convex structures according to Examples 1 to 9 are different from each other as to whether the convex lens-like structure includes single convexities or includes a plurality of convexities.

(Evaluation Result)

The concave-convex structures according to Examples 1 to 9 and Comparative Example 1 fabricated as described above were evaluated. Specifically, the shapes of microstructures of the concave-convex structures according to Examples 1 to 9 and Comparative Example 1 were monitored with an atomic force microscope (AFM) and a scanning electron microscope (SEM).

In addition, in the concave-convex structures according to Examples 1 to 9, the shape of a convexity was measured by AFM, and the average width w of the convexity at h/2 was calculated where b represents the average width of the flat surface at the top part of the convexity, a represents the average width of the area of the convexity at the surface of the base material, and h represents the height of the convexity. Furthermore, in the concave-convex structures according to Examples 1 to 9, the average distance between the centers of gravity of adjacent convexities was calculated by SEM. Note that a, b, w, and the average distance between the centers of gravity were each calculated as an average value of each of convexities within a single group portion.

Furthermore, surface reflection spectra of the concave-convex structures according to Examples 1 to 9 and Comparative Example 1 were measured using a spectrophotometer (V500 available from JASCO Corporation). Table 1 below shows the minimum value of reflectivity at a wavelength between 380 nm and 780 nm. Note that the minimum value of reflectivity at a wavelength between 380 nm and 780 nm is more preferably less than or equal to 1%.

Table 1 below shows a result of measurement of the shape of convexities and the distance between the centers of gravity in the concave-convex structures according to Examples 1 to 9, as well as a result of measurement of reflectivity of the concave-convex structures according to Examples 1 to 9 and Comparative Example 1. In addition, schematic cross-sectional shapes of concavities in the masters (corresponding to convexities in transferred objects) according to Examples 1 to 5 and Examples 8 to 9 determined from the result of measurement with AFM are shown in FIG. 12A to FIG. 12G. FIG. 12A to FIG. 12G are explanatory diagrams respectively showing schematic cross-sectional shapes of the concavities in the masters (corresponding to the convexities in the transferred objects) according to Examples 1 to 5 and Examples 8 to 9. Note that FIG. 12A to FIG. 12G show schematic shapes, and thus may not completely conform with the shapes of actual masters or concave-convex portions of transferred objects.

TABLE 1

| | Shape of convexities | | | | Distance between centers of gravity Average distance | Evaluation |
|---|---|---|---|---|---|---|
| | a [um] | b [um] | (a + b)/2 [um] | w [um] | between centers of gravity [μm] | Reflectivity [%] |
| Example 1 | 0.2 | 0.01 | 0.105 | 0.141 | 1.05 | 0.41 |
| Example 2 | 0.2 | 0.015 | 0.1075 | 0.141 | 0.95 | 0.19 |
| Example 3 | 0.25 | 0.025 | 0.1375 | 0.177 | 1.92 | 1.76 |
| Example 4 | 0.2 | 0.01 | 0.105 | 0.105 | 1.05 | 0.44 |
| Example 5 | 0.2 | 0.01 | 0.105 | 0.095 | 1.05 | 0.64 |
| Example 6 | 0.2 | 0.01 | 0.105 | 0.141 | 0.65 | 1.97 |
| Example 7 | 0.2 | 0.01 | 0.105 | 0.141 | 0.7 | 1.59 |
| Example 8 | 0.2 | 0.01 | 0.105 | 0.141 | 0.81 | 0.67 |
| Example 9 | 0.2 | 0.01 | 0.105 | 0.141 | 2.1 | 2.03 |
| Comparative Example 1 | — | — | — | — | — | 3.80 |

Referring to the result in Table 1, in the concave-convex structures according to Examples 1 to 9, the convex lens-like structures are formed as group portions each including a group of a plurality of convexities. Therefore, it is appreciated that the concave-convex structures according to Examples 1 to 9 are lower in reflectivity than the concave-convex structure according to Comparative Example 1. That is, it is appreciated that an anti-reflection effect higher than that of the concave-convex structure according to Comparative Example 1 can be obtained in the concave-convex structures according to Examples 1 to 9.

In addition, comparing the concave-convex structures according to Examples 1, 4, and 5, it is appreciated that the width w of the convexity at h/2 is smaller than (a+b)/2, and as convexities have a thinner shape, the reflectivity increases, and the anti-reflection effect degrades.

In addition, comparing the concave-convex structures according to Examples 1 and 6 to 8, it is appreciated that in a case where the average distance between the centers of gravity is narrower than the above-described preferable range, an overlap between convexities increases, and the substantial height of the convexities decreases, so that the reflectivity increases, and the anti-reflection effect degrades. On the other hand, comparing the concave-convex structures according to Examples 1 and 9, it is appreciated that in a case where the average distance between the centers of gravity is wider than the above-described preferable range, the flat portion between convexities increases, so that the reflectivity increases, and the anti-reflection effect degrades.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

For example, the concave-convex structure 20 according to the present embodiment can also be used as an optical member, and an electronic apparatus equipped with the concave-convex structure 20 according to the present embodiment is also included in the scope of the present invention.

REFERENCE SIGNS LIST 10 base material
20, 21, 22, 23, 24, 25 concave-convex structure
200 concave-convex portion
201, 202, 203, 204, 205 convexity
210, 211, 212, 213, 214, 215 group portion

The invention claimed is:

1. A concave-convex structure comprising:
a plurality of group portions each including a plurality of convexities provided in a surface of a base material, wherein average widths of areas occupied by the convexities at the surface of the base material are smaller than or equal to a wavelength belonging to a visible light band,
wherein heights of the convexities in each of the group portions increase gradually toward a center of the group portion, and each of the group portions is formed as a convex lens-like structure as a whole,
wherein each of the group portions is configured to function as a single microlens, a plurality of the convexities that constitute each of the group portions are configured to function as a moth-eye structure that has an anti-reflection function, and an entire concave-convex structure consisting of a plurality of the group portions is configured to function as a microlens array having the anti-reflection function by means of the moth-eye structure,
wherein a plurality of the group portions are arranged spaced apart from each other on the surface of the base material with a flat surface therebetween, and a spacing between adjacent group portions is wider than a spacing between adjacent convexities within each of the group portions.

2. The concave-convex structure according to claim 1, wherein
an average distance between centers of gravity of adjacent ones of the concavities or convexities in each of the group portions is more than or equal to 0.65 (x1/2+x2/2) and less than or equal to 2.0 (x1/2+x2/2), where x1 and x2 respectively represent the average widths of the areas occupied by the adjacent ones of the concavities or convexities at the surface of the base material.

3. The concave-convex structure according to claim 1, wherein
average widths of the group portions as a whole are more than or equal to 0.2 μm.

4. The concave-convex structure according to claim 1, wherein
the areas occupied by the concavities or convexities at the surface of the base material have a generally circular shape.

5. The concave-convex structure according to claim 1, wherein
in each of the group portions, each of lengths of the concavities or convexities in a vertical direction with respect to the surface of the base material belongs to any of at least two or more groups having different central values.

6. The concave-convex structure according to claim 1, wherein
in each of the group portions, each of the average widths of the areas occupied by the concavities or convexities at the surface of the base material belongs to any of at least two or more groups having different central values.

7. The concave-convex structure according to claim 1, wherein
lengths of the concavities or convexities in a vertical direction with respect to the surface of the base material are changed gradually within each of the group portions.

8. The concave-convex structure according to claim 1, wherein
the average widths of the areas occupied by the concavities or convexities at the surface of the base material are changed gradually within each of the group portions.

9. The concave-convex structure according to claim 1, wherein
the respective group portions are laid out regularly.

10. The concave-convex structure according to claim 1, wherein
respective group portions are laid out irregularly.

11. The concave-convex structure according to claim 1, wherein
in each of the group portions, respective concavities or convexities are provided in a closest-packed arrangement.

12. An optical member, wherein
the concave-convex structure as defined in claim 1 is used, or a transferred object obtained by transferring the concave-convex structure is used.

13. An electronic apparatus, wherein
the concave-convex structure as defined in claim 1 is used, or a transferred object obtained by transferring the concave-convex structure is used.

14. The concave-convex structure according to claim 1, wherein a flat surface is provided between the adjacent group portions.

15. The concave-convex structure according to claim 14, wherein the flat surface has a width between adjacent group portions larger than a wavelength belonging to the visible light band.

* * * * *